United States Patent [19]

Reichner

[11] Patent Number: 4,791,035
[45] Date of Patent: Dec. 13, 1988

[54] CELL AND CURRENT COLLECTOR FELT ARRANGEMENT FOR SOLID OXIDE ELECTROCHEMICAL CELL COMBINATIONS

[75] Inventor: Philip Reichner, Plum Boro, Pa.

[73] Assignee: Westinghouse Electric Corp., Pittsburgh, Pa.

[21] Appl. No.: 130,913

[22] Filed: Dec. 10, 1987

[51] Int. Cl.[4] .............................................. H01M 8/12
[52] U.S. Cl. ........................................... 429/31; 429/34
[58] Field of Search ...................................... 429/31, 34

[56] References Cited

U.S. PATENT DOCUMENTS

| | | | |
|---|---|---|---|
| 3,402,230 | 9/1968 | White | 264/104 |
| 3,460,991 | 8/1968 | White | 136/86 |
| 3,702,019 | 11/1972 | Pollack | 136/34 |
| 3,835,514 | 9/1974 | Pollack | 29/2 |
| 3,895,960 | 7/1975 | Brown et al. | 136/36 |
| 4,174,260 | 11/1979 | Schmidberger | 429/31 |
| 4,395,468 | 7/1983 | Isenberg | 429/31 |
| 4,490,444 | 12/1984 | Isenberg | 429/31 |
| 4,728,584 | 3/1988 | Isenberg | 429/31 |

Primary Examiner—Donald L. Walton
Attorney, Agent, or Firm—Daniel P. Cillo

[57] ABSTRACT

A solid electrolyte electrochemical cell combination 1 is made, comprising an annular, axially elongated, inner electrode 2 containing at least one interior gas feed conduit 3; annular solid electrolyte segments 4 around and covering portions of the inner electrode; annular outer electrode segments 6 around and covering portions of the electrolyte segments; electronically conducting, non-porous, interconnection material 5 disposed between electrolyte segments and in contact with the inner electrode, and electronically conducting, porous, metal fiber current collector felts 7 disposed on top of the non-porous interconnect material and outer electrode segments, where both the non-porous interconnect material and the porous metal felts are disposed circumferentially about the cell, transversely to the axial length of the cell and the inner electrode is continuous for the entire axial length of the cell combination.

15 Claims, 2 Drawing Sheets

CELL AND CURRENT COLLECTOR FELT ARRANGEMENT FOR SOLID OXIDE ELECTROCHEMICAL CELL COMBINATIONS

GOVERNMENT CONTRACT

The Government of the United States of America has rights in this invention pursuant to Contract No. DEAC0280-ET17089, awarded by the U.S. Department of Energy.

BACKGROUND OF THE INVENTION

1. Field of the Invention

The present invention relates to high temperature, solid oxide electrolyte electrochemical cells and cell configurations and the electronic connection of such cells and configurations.

2. Description of the Prior Art

High temperature, solid oxide electrolyte fuel cell configurations, and fuel cell generators, are well known in the art, and are taught by Isenberg, in U.S. Pat. Nos. 4,395,468 and 4,490,444. These fuel cell configurations comprise a plurality of individual, series and parallel electronically connected, axially elongated, generally tubular cells. Each cell is electronically connected in series to an adjacent cell in a column, through narrow cell connections extending the full axial length of each cell. These connections contact the air electrode of one cell and the fuel electrode of an adjacent cell, through a conductive ceramic interconnection and a fiber metal felt strip. Other than one embodiment showing segmentation of the cells in U.S. Pat. No. 4,490,444, all support, electrolyte, electrode, interconnection and fiber metal strip components extended the entire length of the cell.

The felt strip current collector, made, for example of nickel fibers, bonded at contact points, extended axially between the cells. In the preferred embodiment, air was flowed inside the cells and gaseous fuel outside. The nickel felt used in the preferred embodiment was about 70% to 97% porous and was generally made according to the teachings of Brown et al., in U.S. Pat. No. 3,895,960, and Pollack, in U.S. Pat. Nos. 3,702,019 and 3,835,514, all involving the use of solid nickel fibers, and metallurgical, diffusion bonding at fiber contact points, at about 900° C. to 1,200° C.

Self-supporting, low circumferential voltage gradient, solid oxide electrolyte fuel cells were developed by Reichner in U.S. Ser. No. 034,245, now U.S. Pat. No. 4,767,681 filed on Apr. 6, 1987, and assigned to the assignee of this invention. There, an electronically conducting central portion was added to the axial air electrode and utilized to strengthen it, eliminating a need for a separate support. This central portion allowed ease of electron travel to axial, conductive, ceramic interconnects, which covered only a small middle section of the air electrode top surface, and which supported fiber metal felts which were disposed parallel to the fuel cell length and gas flow. Elongated configurations, providing a flattened fuel cell with a plurality interior gas feed chambers were also taught. Here again, all support, electrolyte, electrode interconnection and fiber metal strip components extended unbroken, the entire axial length of the cell.

White, in U.S. Pat. Nos. 3,402,230, and 3,460,991, taught a self-supporting, one piece, tubular, high temperature, solid electrolyte fuel cell tube. There, an elongated, tubular, gas tight series connected cell stack was taught, with solid electrolyte generally disposed between air electrodes and fuel electrodes. The cell tube was formed as a continuous tube, rather than assembled as a series of individual cells. Gaps between the cells were filled with an overlap of top air electrode, overrunning the underlying solid electrolyte, to physically and electrically contact the bottom electrode forming an electrode-to-electrode connection on the tubular structure. Calcia stabilized electrolyte was taught, along with a variety of cathode and anode materials. Electronic connections, shown as conductive wires between individual fuel cell stack tubes were made in series, directly from the end inner electrode of one cell struck tube to the end outer electrode of a parallel, adjacent cell stack tube.

Larger diameter, self-supporting, stacked, solid oxide electrolyte fuel cells were developed by Isenberg in U.S. Pat. No. 4,728,584, and. There, a fuel cell was made up of a plurality of individual cell elements with an annular, electronically conductive interconnection member between each stacked, discrete element. Each cell element on adjacent fuel cells in series was staggered from the other. Conductive assembly connectors contacted interconnection ring members of an adjacent fuel cell. These conductive assembly connectors, shown as thin conductive wires, were disposed at a 90° angle to the former, axially oriented metal fiber felts of the Isenberg structures, taught in U.S. Pat. Nos. 4,395,468 and 4,490,444. Thus the electrical connections between adjacent, stacked fuel cells was transverse rather than parallel to fuel cell axial length and gas flow. These conductive assembly connectors only connected two cells together, i.e., the fuel electrode of one cell to the interconnection ring of an adjacent cell, which interconnection ring contacted the air electrode of the adjacent cell. This type of construction, however, provides for many joints and complicates fabrication of the fuel cell itself and assembly into cell stacks.

None of these configurations provides for a simple geometry and connection pattern between adjacent fuel cells that allows stronger, larger cells, with greater power per unit, and eliminates circumferential voltage drop in the air electrode and non-uniformity in electrolyte current density.

3. Object of the Invention

It is the object of this invention to provide new types of solid oxide electrolyte electrochemical cell combination and array configurations, utilizing continuous air electrode supported fuel cells, having contacting, circumferential, electronic connections and supports, and to greatly simplify assembly procedures for stacks of series and parallel connected cells.

SUMMARY OF THE INVENTION

The above needs and object have been met by the present invention which in its broadest aspect, provides a high-temperature, solid electrolyte, axially elongated electrochemical cell combination, with all interconnection segments and all metal fiber current collector supports disposed transversely to the axial length of the cell. By the term "cell combination", is herein meant the fuel cell containing a supported of unsupported air electrode, a fuel electrode, electrolyte between the electrodes, a non-porous, electronically conducting, ceramic interconnection, contacting some portion of the air electrode and a porous, metal fiber, current collector felt contacting the top of the ceramic interconnection material. Thus, the fiber metal felt is a part of the cell combination.

More specifically, the cell combination comprises an annular air electrode, annular fuel electrode segments surrounding portions of the air electrode, and annular electrolyte segments disposed therebetween, where the air electrode is continuous for the entire axial length of the cell and contains at least one interior gas feed conduit, each cell having at least one electronically conductive, porous, metal fiber current collector felt in electronic connection with the air electrode, generally through an electronically conducting, ceramic interconnection material, and disposed around the cell transversely to the axial length of the cell, and at least one electronically conductive, porous, metal fiber, current collector felt contacting a portion of the fuel electrode segments and disposed around the fuel electrode transversely to the axial length of the cell.

These electrochemical cell combinations, containing attached fiber metal current collector felts, can be placed next to similar electrochemical cells, and the metal fiber felts connected in series and parallel to provide an electrochemical cell array or assembly. This array in turn can be placed in a housing where a first gaseous reactant is flowed into the inside of the inner air electrodes, to contact the air electrodes, and a second gaseous reactant is flowed about the outside of the outer fuel electrode, to contact the fuel electrode. For series connection, in such an array, a central electrochemical cell has its fuel electrode electronically contacted in series to the air electrode of the cell above it and electronically insulated from the air electrode of the cell below it. Said central electrochemical cell has its air electrode electronically insulated from the fuel electrode of the cell above it and electronically connected in series to the fuel electrode of the cell below it, where the central electrochemical cell is displaced axially from the cells above and below it. For parallel connection, like components of adjacent cells on a horizontal plane are contacted electronically, through the metal fiber felts without axial displacement of connected cells in side by side relation.

The cell combination may be built on a porous ceramic support tube, but preferably, the air electrode is self-supporting, and is electronically connected to the porous, metal fiber collector felts through an electronically conductive, non-porous, ceramic interconnection material. The cells can be of a circular, flattened, or other design, and may have more than one gas feed conduit each. This cell configuration permits the current path length, parallel to the longitudinal axis and through the air electrode, and therefore its path resistance to remain fixed, and independent of cell diameter. The use of a continuous air or inner electrode eliminates complicated, high temperature bonding of discrete cell segments and greatly simplifies construction, lowering costs substantially and eliminating potential gaseous leakage problems. Annular metal fiber current collector felts permit series and parallel electronic connections to be made merely by pressing adjacent cell combinations against one another and thus greatly simplifies cell array assembly.

BRIEF DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
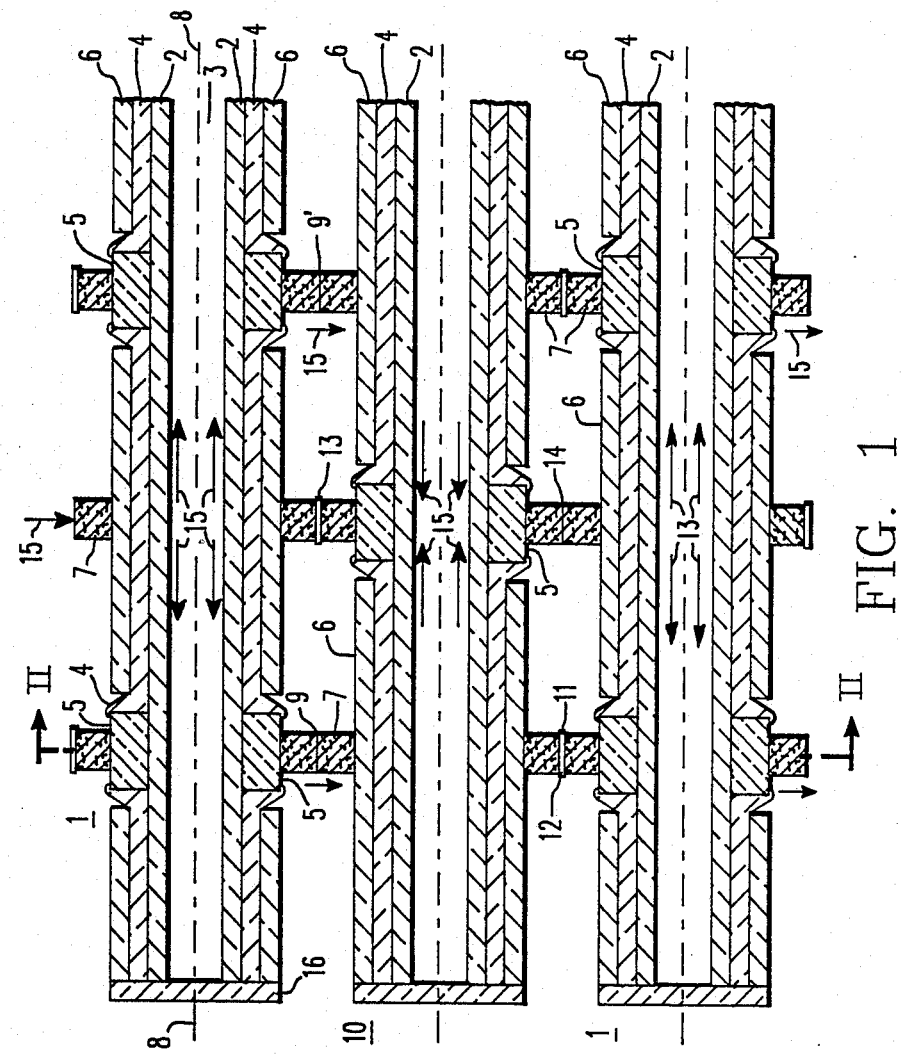
FIG. 1, which best illustrates the invention, is an axial cross-sectional view of an electrochemical cell combination array, showing porous, metal fiber, current collector felts disposed around the cells and transverse to the cell axis, and also showing the annular air electrodes, annular electrolyte segments, annular fuel electrode segments, and non-porous, annular, ceramic interconnection material.
Figure 2:
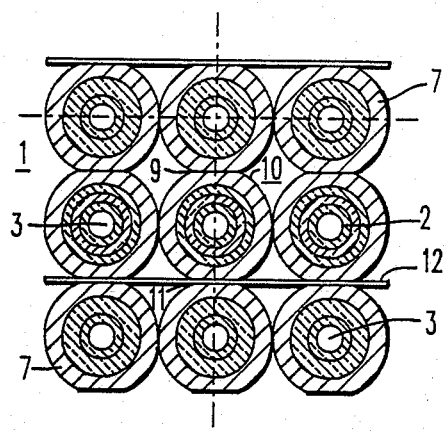
FIG. 2, is a cross-sectional view through the cell and the current collector felts of the electrochemical cell configurations of FIG. 1, along line II—II showing a square pitch pattern, with three, parallel-connected cells in each horizontal side by side layer, and annular, circular cells.

Referring now to FIGS. 1 and 2 of the Drawings, one embodiment of part of an electrochemical cell stack combination is shown. The cells 1, preferably fuel cells, consist of a porous, inner, annular, air electrode 2, about 500 microns to 1500 microns thick, comprised, for example, of doped or undoped oxides or mixtures of oxides in the perovskite family, such as, $LaMnO_3$, $CaMnO_3$, $LaNiO_3$, $LaCoO_3$ and $LaCrO_3$. An optional support tube (now shown) generally of porous calcia stabilized zirconia may be used beneath the air electrode. In many instances, if the air electrode is strengthened or is thick enough, the support tube can be eliminated. The inner electrode 2 has at least one internal gas feed conduit 3 and extends continuous and unbroken the entire axial length of the cell.

Portions of the air electrodes are covered with an annular layer of solid, non-porous, ceramic electrolyte in segments 4, providing a discontinuity in the electrolyte. The non-porous, ceramic electrolyte, which is about 20 microns to 100 microns thick, can be a material such as yttria stabilized zirconia. The remaining portions of the air electrodes are covered with an annular layer of conductive, non-porous, ceramic interconnection material 5, such as a calcium, strontium or magnesium oxide doped lanthanium chromite film, about 10 microns to about 100 microns thick. This interconnection material is disposed in the discontinuity between electrolyte segments, to contact air electrode. This ceramic interconnection material 5 is disposed at a 90° angle to the axial length 8 of the cells. Porous, annular, fuel electrode material segments 6, such as nickel-zirconia cermet, about 100 microns thick, cover the electrolyte segments 4.

The ceramic interconnection 5 may have a metal, for example nickel or cobalt, up to about 20; microns thick deposited on it, and in turn be covered with a thin layer of fuel electrode material (neither shown in the figures) to improve contact with the electronically conductive, porous, metal fiber, conductor felt strips 7. These strips 7 are also disposed at a 90° angle to the axial length 8 of the cells. Thus, both the ceramic interconnections 5 and the porous felts 7 are transverse rings around the circumference of the cells, transverse to the axis of the cells. The discontinuity in the electrolyte, which contains the ceramic interconnection material, is about 5% to 30% of the length of the electrolyte segments between the interconnection material. Usually the width of the porous metal fiber felts 7, along the cell axis 8, is the same for felts contacting ceramic interconnection material 5 and felts contacting outer electrode segments 6.

As can be seen, these porous, electronically conductive, circumferential, fiber metal, current collector strips 7, provide both a current collecting-electron transferring function and a fuel cell support function. While the fuel cells 1 shown are of circular cross section, other geometries, such as a flattened design, may be used. The term "annular" as used herein thus can include a variety of closed cross-sections.

In the assembly shown in FIG. 1, along line II—II, a central electrochemical cell 10 is disposed in an array, between a plurality of adjacent, parallel, axially elongated cells, and has its fuel electrode 6 electronically contacted in series through the fiber metal, current collector felts 7, as at point 9, to the interconnection 5 and to the air electrode 2 of the cell above it. The fuel electrode 6 is electronically insulated from both the current collector felt and the air electrode of the cell below it, as at point 11 by an insulating sheet material 12, preferably alumina, utilized to prevent short circuits between cells as shown in FIG. 2, which is a cross section along line II—II of FIG. 1. Said central electrochemical cell 10 has its air electrode, interconnection material and collector felt electronically insulated from the fuel electrode of the cell above it as shown at point 13, and has its air electrode electronically connected in series to the fuel electrode of the cell below it, through the collector felts, as shown at point 14, in FIG. 1. As also shown in FIG. 1, the central electrochemical cell is similar in configuration but is positioned so that it is displaced axially from the cells above and below it for series connection.

Electrical current, shown as arrows 15, flow as shown in FIG. 1, where current flow 15 returning from an external circuit will enter the fuel electrode 6 of the upper cell in FIG. 1 through the nickel fiber collector felt 7. The current passage through the electrolyte will then flow in both longitudinal directions through the air electrode to the nearest ceramic interconnect rings and through the nickel fiber collector felts 7 at points 9 and 9' into the central cell combination 10, and similarly through felts 7 at point 14 into the lower cell combination.

Figure 3:
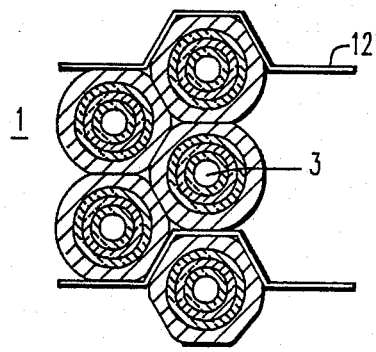
FIG. 3, is a cross-sectional view across the connection felts of an electrochemical cell stack configuration, showing a triangular pitch pattern and circular cells.

In all cases, as can be seen from FIGS. 1 and 2, both the conducting, non-porous interconnections 5 and the porous, fiber metal, current collector felts 7 supported by the interconnections, are disposed circumferentially around the cells in a simple circular fashion, electronically connected to the inner air electrodes, as narrow, annular, circumferential rings, transverse rather than parallel to the axial length of the cells and gas flow. Also, the air electrode, electrolyte segments, fuel electrode segments, interconnection segments, and metal-felt segments are all of annular design, i.e., a closed configuration circumferential to the axis of the cells. Also shown in FIG. 1 are non-porous end caps 16 at the end of gas conduits 3, which may be used in conjunction with oxidant feed tubes (not shown), which can introduce oxidant at the closed end and permit its exhaust at the open end of the cell combination, as is well known in the art. In most cases, the cells will be of a circular cross-section as shown in FIGS. 2 and 3.

In operation, an oxygen containing oxidant gas is fed through the gas feed conduits 3 to the inside of the porous air electrode tubes 2, so that oxygen gas permeates the air electrode. A second gas, containing a fuel, for example, carbon monoxide, hydrogen, or their mixtures, is passed over the porous fuel electrodes 6 on the outside of and between the fuel cells 1 and 10. When the oxygen migrates as an ion through the said electrolyte 4 it reacts with the fuel permeating the porous fuel electrode 6, generating heat and electricity. Additional details regarding fuel cell component materials, and operation of the fuel cells can be found in U.S. Pat. Nos. 4,395,468; 4,490,444 and 4,648,945, herein incorporated by reference.

The finished, fibrous metal, current collector strip bodies 7, are high-temperature stable. By "high-temperature stable" is meant that the fibrous bodies contain fibers or other materials that have melting points of at least 1000° C. and that preferably will not melt at the 1100° C. to 1200° C. temperatures usually required to process them. The finished fiber metal felts 7 are from 70% to 97% porous (3% to 30% of theoretical density), preferably 90% to 97% porous, as shown inserted and compressed between the fuel cells 1 and 10 in FIGS. 1 and 2. The finished fibrous bodies consist essentially of bonded, interlocking fibers selected from the group consisting of coated and uncoated metal fibers, selected from the group consisting of nickel and cobalt fibers, preferably nickel fibers. These fibers can range from about 0.38 cm (0.15 inch) to 1.27 cm (0.50 inch) long, and have a diameter of from about 0.0013 cm (0.0005 inch) to 0.025 cm (0.01 inch). The nickel or cobalt fibers can be made by well known techniques of machining foil, bar stock or wire, to provide cold worked, hardened fibers. The fiber metal felt thickness is about 0.16 cm (0.06 inch) to 0.64 cm (0.25 inch) prior to compression between adjacent cells. The metal felts are not solid metal nor of a wire construction.

In the method of making the porous, electronically conducting, high-temperature stable fibrous bodies 7, fibers can be felted or laid down by any appropriate means, in a simple random, intermingled orientation, or at some specified angle, as shown, for example in U.S. Pat. Nos. 3,895,960 and 3,835,514, respectively, and then diffusion bonded together. Diffusion bonding is for a time sufficient to allow interdiffusion of atoms across the fiber interface where the fibers contact, without any melting. After diffusion bonding, the bonded fibrous body can be easily handled, acquiring strength and structural integrity. Then the fibrous body can be cut to a length equal to the circumference of the cell at the interconnection material and wrapped around the cells over the interconnections. Alternatively, the fiber metal current collector felts can be laser cut from fiber metal pad blocks as continuous rings and slipped over the cell to the desired position. These fiber metal collector felts generally will be about 0.64 cm (0.25 inch) wide and about 0.16 cm (1/16 inch) thick at the point of maximum compression after cell stack assembly.

Figure 4:
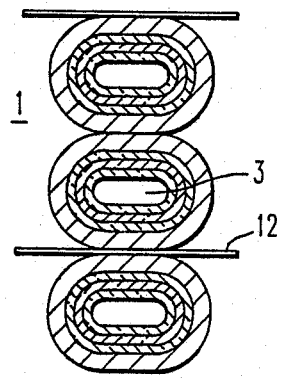
FIG. 4, is a cross-sectional view across the connection felts of an electrochemical cell stack configuration of FIG. 1, showing annular, flattened cells.

FIG. 3 shows an alternate triangular pitch configuration rather than the square pitch configuration of FIG. 2. The triangular pitch reduces the overall size of the cell stack when large quantities of cell combinations are to be used, such as in large electrical power generators. FIG. 4 shows the use of a flattened cell design cross-section. In all the figures, the insulating strips 12 may be placed prior to compressing the fiber metal felts during fabrication of the cell bundles.

I claim:

1. A high-temperature solid electrolyte electrochemical cell combination, comprising an annular, axially elongated, continuous, interior electrode containing at least one interior gas feed conduit therein, annular, solid electrolyte segments around and covering portions of the inner electrode; annular outer electrode segments around and covering the electrolyte segments; annular, electronically conducting, non-porous, interconnection material disposed between electrolyte segments and in contact with the inner electrode; and annular, electronically conducting, porous, metal-fiber current collector felts disposed on and around the annular interconnection material and portions of the annular outer electrode segments, where the interconnection material and metal fiber felts are disposed circumferentially about the cell combination, transversely to the axial length of the cell combination.

2. The high-temperature cell combination of claim 1, where the cell is a fuel cell and the porous, metal fiber felts are selected from the group consisting of coated and uncoated nickel fibers.

3. The high-temperature cell combination of claim 1, where the interconnection material is a doped lanthanum chromite material.

4. A high-temperature solid electrolyte electrochemical cell combination, comprising an axially elongated, inner, annular electrode having at least one interior gas feed conduit therein; solid electrolyte having a discontinuity therein disposed around and contacting the inner electrode; an outer electrode disposed around and contacting the electrolyte; and an electronically conducting, non-porous interconnection material disposed on the inner electrode within the discontinuity in the electrolyte; the improvement characterized in that the inner electrode is continuous, the non-porous, interconnection material is disposed circumferentially about the cell, transversely to the axial length of the cell, and both the interconnection material and the outer electrode have porous, metal fiber current collector felts disposed thereon, where the porous metal fiber felts are disposed circumferentially about the cell, transversely to the axial length of the cell combination.

5. The high-temperature cell combination of claim 4, where the cell is a fuel cell and the fibers of the porous metal fiber felts are selected from the group consisting of coated and uncoated metal fibers selected from the group consisting of coated and uncoated nickel fibers and cobalt fibers.

6. The high-temperature cell combination of claim 4, where interconnection material is a doped lanthanum chromite material, and the air electrode length is continuous for the entire axial length of the cell.

7. The high-temperature cell combination of claim 4, where the cell has a circular cross-section.

8. The high-temperature cell combination of claim 4 where the discontinuity in the electrolyte is about 5% to 30% of the length of the electrolyte segments.

9. An array of electrochemical cell combinations comprising one central, axially elongated cell and a plurality of adjacent, parallel, axially elongated cells, said cells having an inner, annular electrode having an interior gas feed conduit therein; solid oxide electrolyte segments disposed around and contacting axial portions of the inner electrode with discontinuities between the electrolyte segments; and outer electrode segments disposed around and contacting the electrolyte segments, with the inner electrode being continuous for the entire axial length of the cells, where each cell has an electronically conducting, non-porous, interconnection material contacting the inner electrode between segments of electrolyte, where the non-porous interconnection material is disposed circumferentially about the cell, transversely to the axial length of the cell, and both the non-porous interconnection material and the outer electrode have electronically conducting, porous metal fiber current collector felts disposed thereon, where the porous metal fiber felts are disposed circumferentially about the cell, transversely to the axial length of the cell, and where the central cell is positioned so that its fuel electrodes are electronically connected through metal fiber felts to the interconnection material of the cell above it and electronically insulated from the interconnection material of the cell below it, and where the central cell has its interconnection material electronically insulated from the outer electrode of the cell about it and electronically connected through metal fiber felts to the outer electrode of the cell below it.

10. The array of claim 9, where the fibers of the metal fiber felts are selected from the group consisting of coated and uncoated metal fibers selected from the group consisting of nickel fibers and cobalt fibers.

11. The array of claim 9, where the cells are fuel cells and the interconnection material is doped lanthanum chromite material.

12. The array of claim 9 where the inner electrode is an air electrode, the outer electrode is a fuel electrode, oxidant is fed into the gas feed conduit in the air electrode and gaseous fuel is fed around the cells to contact fuel electrode.

13. The array of claim 9, where the cell combinations have circular cross-sections.

14. The array of claim 9, where the cell combinations have a flattened cross-section.

15. The array of claim 9, where the cell combinations are in a square pitch configuration.

* * * * *